United States Patent
Chiu

(10) Patent No.: US 9,302,336 B2
(45) Date of Patent: Apr. 5, 2016

(54) WIDTH ADJUSTABLE WORKTABLE

(75) Inventor: Cheng-Hung Chiu, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 1350 days.

(21) Appl. No.: 13/116,135

(22) Filed: May 26, 2011

(65) Prior Publication Data

US 2011/0297054 A1 Dec. 8, 2011

Related U.S. Application Data

(60) Provisional application No. 61/350,527, filed on Jun. 2, 2010.

(30) Foreign Application Priority Data

Jun. 2, 2010 (TW) .................................. 99117763

(51) Int. Cl.
| | |
|---|---|
| A47B 37/00 | (2006.01) |
| A47B 13/08 | (2006.01) |
| B23D 47/02 | (2006.01) |
| B25H 1/14 | (2006.01) |
| F16B 7/14 | (2006.01) |

(52) U.S. Cl.
CPC ................ B23D 47/025 (2013.01); B25H 1/14 (2013.01); F16B 7/1427 (2013.01)

(58) Field of Classification Search
CPC ........ B23D 47/025; F16B 7/1427; B25H 1/14
USPC ................ 108/50.11, 137; 83/471.3
See application file for complete search history.

(56) References Cited

U.S. PATENT DOCUMENTS

| 76,526 | A | * | 4/1868 | Robertson ...................... 403/104 |
|---|---|---|---|---|
| 349,005 | A | * | 9/1886 | Sargent ......................... 403/362 |
| 3,259,407 | A | * | 7/1966 | Welt ............................... 403/350 |
| 4,452,117 | A | * | 6/1984 | Brickner et al. ................. 83/468 |
| 4,964,450 | A | * | 10/1990 | Hughes et al. ................ 144/287 |
| 5,752,449 | A | | 5/1998 | Simon et al. |
| 5,791,700 | A | * | 8/1998 | Biro .................................. 292/7 |
| 5,967,205 | A | * | 10/1999 | Welsh et al. ................ 144/117.1 |

(Continued)

FOREIGN PATENT DOCUMENTS

| CN | 1117262 A | 2/1996 |
|---|---|---|
| CN | 2853350 Y | 1/2007 |

(Continued)

OTHER PUBLICATIONS

Chinese Office Action dated Mar. 5, 2013, for CN 201010238657.3, and English translation thereof.

*Primary Examiner* — Lee D Wilson
*Assistant Examiner* — Joel Crandall
(74) *Attorney, Agent, or Firm* — Bacon & Thomas, PLLC

(57) ABSTRACT

A width adjustable worktable includes a worktable body, an extension member movable relative to the body, a first guide rod connected to the extension member and a control set rotatably mounted in the extension member. The control set is operable to move the first guide rod between a locking position, where the first guide rod is prevented from moving relative to the worktable body, and an adjustable unlocking position, where the first guide rod is unlocked and movable relative to the worktable body for allowing the user to move the extension member carried by the first guide rod to adjust the width of the worktable.

22 Claims, 17 Drawing Sheets

(56) References Cited

U.S. PATENT DOCUMENTS

| | | |
|---|---|---|
| 6,293,176 B1 * | 9/2001 | Talesky .................. 83/438 |
| 6,725,755 B1 * | 4/2004 | Svetlik .................. 83/468 |
| 6,786,122 B2 * | 9/2004 | Svetlik .................. 83/468 |
| 7,036,414 B2 * | 5/2006 | Behne et al. ............. 83/468.7 |
| 7,047,856 B2 * | 5/2006 | Nurenberg et al. ........ 83/471.3 |
| 7,367,253 B2 * | 5/2008 | Romo et al. ............. 83/471.3 |
| 8,250,956 B2 * | 8/2012 | Cox et al. .............. 83/471.3 |
| 2001/0047706 A1 * | 12/2001 | Parks et al. ............ 83/435.12 |
| 2002/0050201 A1 * | 5/2002 | Lane et al. ............. 83/477.2 |
| 2002/0174755 A1 * | 11/2002 | Behne et al. ............ 83/446 |
| 2003/0230681 A1 | 12/2003 | Gwynneth |
| 2005/0204884 A1 * | 9/2005 | Huang .................. 83/477.2 |
| 2007/0272066 A1 * | 11/2007 | Phillips et al. .......... 83/435.11 |

FOREIGN PATENT DOCUMENTS

| | | |
|---|---|---|
| EP | 2116328 A1 | 11/2009 |
| EP | 2199000 A1 | 6/2010 |
| EP | 2392427 A1 | 12/2011 |
| EP | 2392427 B1 | 9/2013 |

* cited by examiner

WIDTH ADJUSTABLE WORKTABLE

This application is a non-provisional application claiming the benefit from U.S. Provisional Application No. 61/350,527, filed on Jun. 2, 2010, and Taiwanese Application No. TW 099117763 filed on Jun. 2, 2010, the disclosure of each of which is incorporated by reference herein in the entirety.

FIELD OF THE INVENTION

The present disclosure relates to worktables for machine tools and more particularly, to a width adjustable worktable that facilitates adjustment of the width of the worktable.

BACKGROUND

Referring to FIGS. 1 and 2, an extendable worktable 1 is shown used in a machine for carrying a workpiece (not shown). The extendable worktable 1 includes a body 11, two extension members 12 arranged at two opposite sides relative to the body 11 and movable toward or away from the body 11. Four guide rods 13 are respectively connected to the extension members 12 and are mounted into the bottom side of the body 11 and are movable with the extension members 12 relative to the body 11. Four clamps 14 located on the bottom side of the body 11 and are respectively attached to the guide rods 13, and four locking levers 15 are respectively coupled to the clamps 14 and are operable to move the clamps 14 between a locking position, where the clamps 14 lock the respective guide rods 13 from moving relative to the worktable body 11, and an unlocking position, where the clamps 14 allow the guide rods 13 to move with the extension members 12 relative to the body 11 to accommodate different sized workpieces on the worktable 1.

However, in order to move the extension members 12, it is necessary to first operate the locking levers 15 for enabling the clamps 14 to release the respective guide rods 13, and then to move the extension members 12 relative to the body 11, and then to operate the locking members 15 to lock the guide rods 13 from further movement. This manner of operating the extendable worktable 1 is inconvenient.

SUMMARY

The present disclosure provides embodiments of a width adjustable worktable, which facilitates quick adjustment of the width of the worktable.

In particular, a width adjustable worktable includes a worktable body, an extension member movable relative to the worktable body, at least one first guide rod connected to the extension member and movably mounted to or into the worktable body, and a control set biasably mounted at the extension member for moving the at least one first guide rod between a locking position and an adjustable unlocking position.

An effect of the embodiments present disclosure enables a user to operate the control set with a single hand, to change the positioning status of the at least one first guide rod. When the control set is operated, a user can directly grasp and move the extension member relative to the worktable body in order to adjust the width of the worktable.

BRIEF DESCRIPTION OF THE DRAWINGS

Other and further benefits, advantages and features of the present disclosure will be fully understood by reference to the following specification in conjunction with the accompanying drawings, in which.

DETAILED DESCRIPTION

The various objects and advantages of the present invention will be more readily understood from the following detailed description of four embodiments when read in conjunction with the appended drawings, in which like reference numbers denote like elements of structure.

Figure 3:
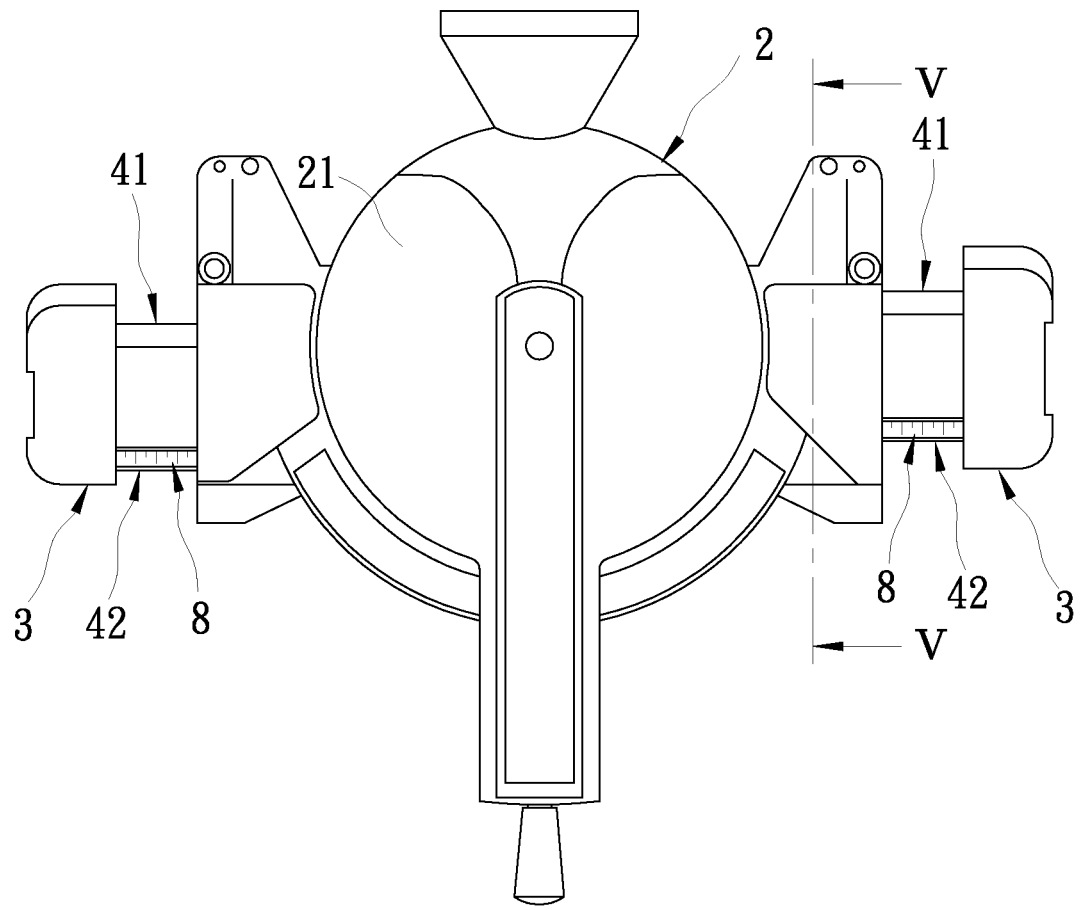
FIG. 3 is a top view of a width adjustable worktable in accordance with a first embodiment of the present disclosure.
Figure 4:
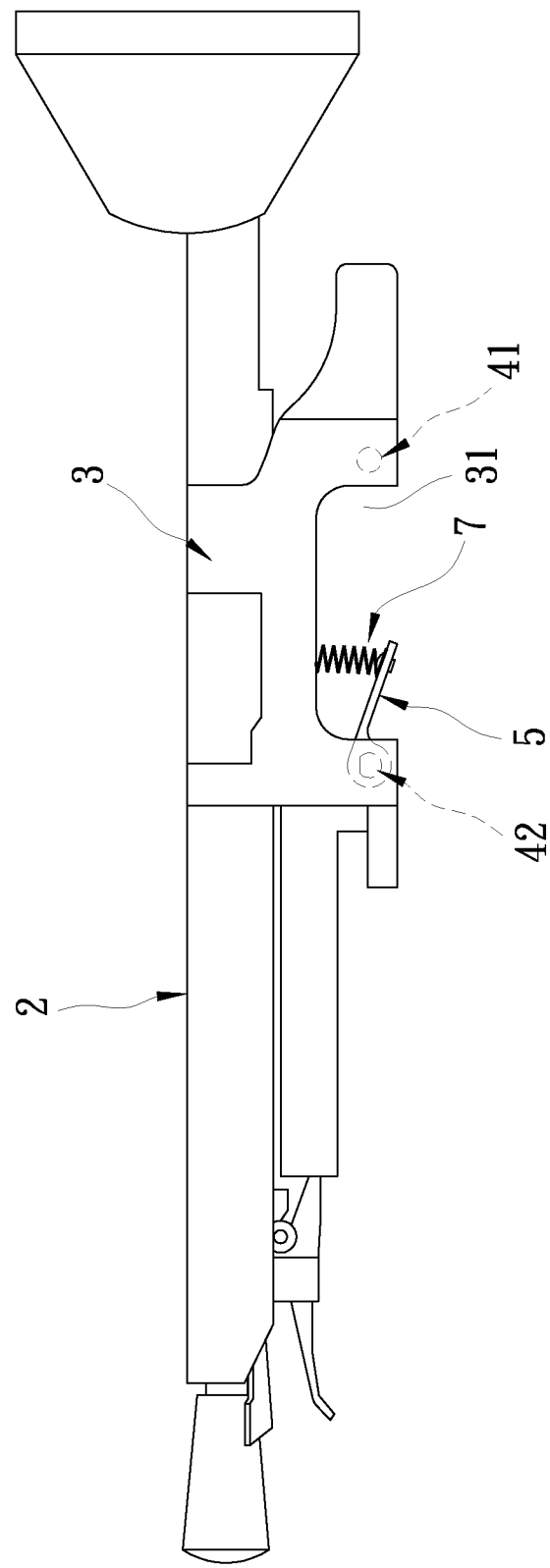
FIG. 4 is a side view of the width adjustable worktable in accordance with the first embodiment of the present disclosure.
Figure 5:
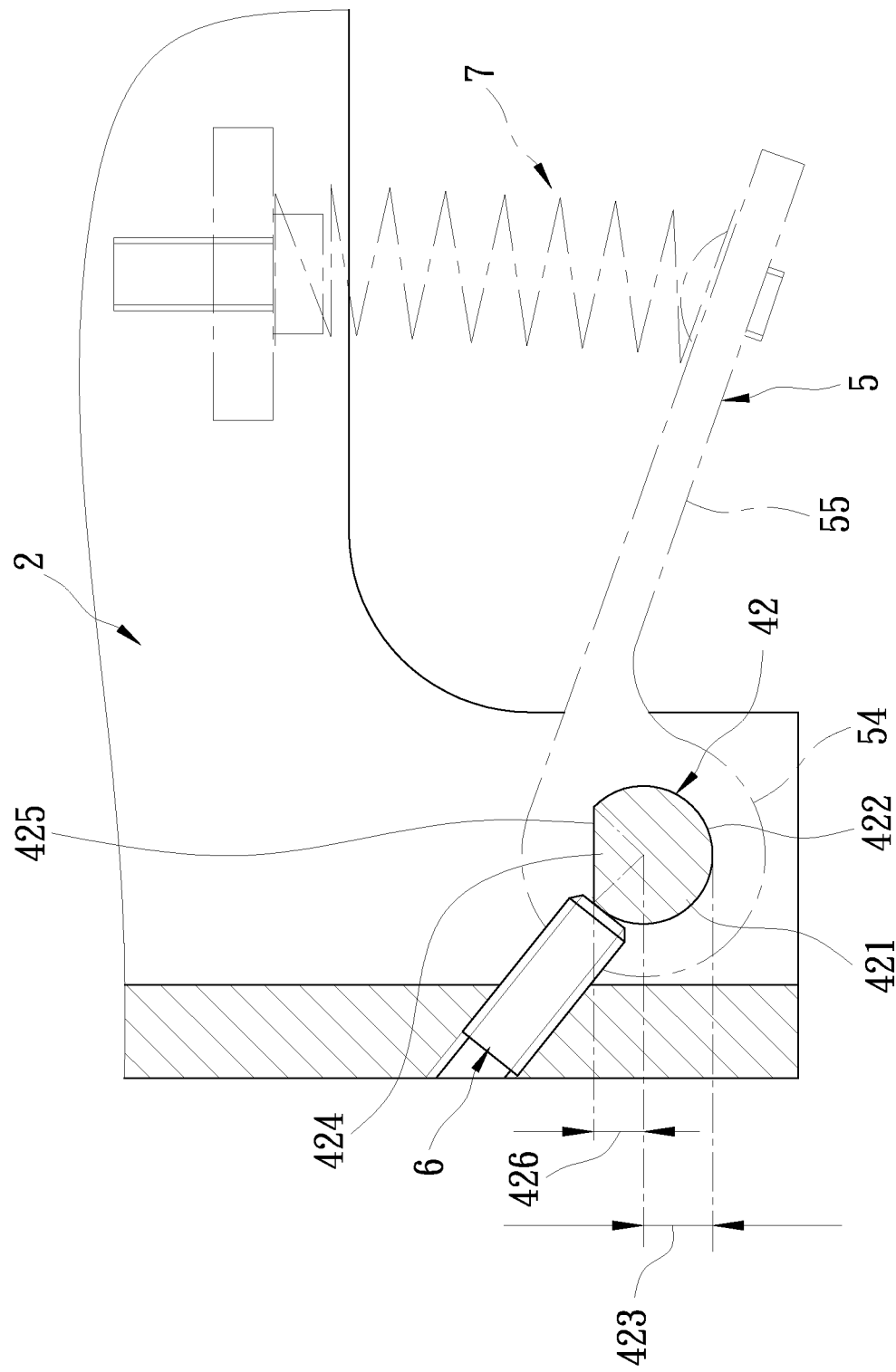
FIG. 5 is a sectional view taken along line V-V of FIG. 3, illustrating one first guide rod moved with the associated control set to the locking position.

Referring to FIGS. 3, 4 and 5, a width adjustable worktable in accordance with a first embodiment of the present disclosure is shown having a worktable body 2, two extension members 3, two first guide rods 42, two second guide rods 41, two control sets 5 respectively associated with the two first guide rods 42, two stop members 6 respectively associated with the two first guide rods 42 and two control sets 5, two spring members 7 respectively associated with the two control sets 5, and two scales (indicia) 8 respectively associated with the two first guide rods 42.

The worktable body 2 has a top wall 21 for carrying a workpiece (not shown) for cutting.

The extension members 3 are respectively coupled to two opposed sides of the worktable body 2 and are movable relative to the worktable body 2 in a direction toward or away from the worktable body 2. Each extension member 3 has a groove 31 located on the bottom side thereof, which extends along the width thereof in a direction corresponding to the moving direction of respective extension member 3 relative to the worktable body 2.

The second guide rods 41 are respectively connected to the extension members 3 and are movably mounted with or into the bottom side of the worktable body 2. According to this embodiment, each second guide rod 41 is a round rod having a circular cross section.

The first guide rods 42 are respectively connected to the extension members 3 in a parallel manner relative to the second guide rods 41 and are movably mounted with or into the bottom side of the worktable body 2. Each first guide rod 42 is rotatable about its own axis, and includes a first big radial portion 421 having a first large size and a second radial portion 424 having a second size smaller than the first large sized radial portion. The first big radial portion 421 includes an arc shaped surface 422 disposed at an outer side thereof and defined by a minimum first radius 423 corresponding to the axis of the respective first guide rod 42. The second small radial portion 424 includes a flat cut plane 425 disposed at an outer side thereof and defined at the center thereof by a minimum second radius 426 corresponding to the axis of the respective first guide rod 42. The minimum second radius 426 of the second small radial portion 424 has a length that is shorter than the minimum first radius 423 of the first big radial portion 421.

The control sets 5 are respectively mounted in the grooves 31 of the extension members 3, and each include an axle sleeve 54 generally concentrically arranged on one respective first guide rod 42 and a handle 55 extending from the axle sleeve 54. When the control sets 5 are rotated, the first guide rods 42 are rotated by the respective control sets 5 between a locking position, shown in FIG. 5, and an adjustable unlocking position, shown in FIG. 6.

The stop members 6 are respectively mounted at the worktable body 2 and extend toward the first guide rods 42. According to this embodiment, the stop members 6 are adjustment screws fastened to the worktable body 2.

The spring members 7 are respectively positioned between the extension members 3 and the control sets 5 in order to bias the control sets 5 into an unactuated, locking configuration. According to this embodiment, the spring members 7 are compression springs.

The scales 8 are respectively arranged on the flat planes 425 of the first guide rods 42 to indicate the respective moved distance of the extension members 3 (i.e., the adjusted width of the worktable). It is to be understood that the scales 8 can be formed integral with the second guide rods 41 or the first guide rods 42.

Figure 6:
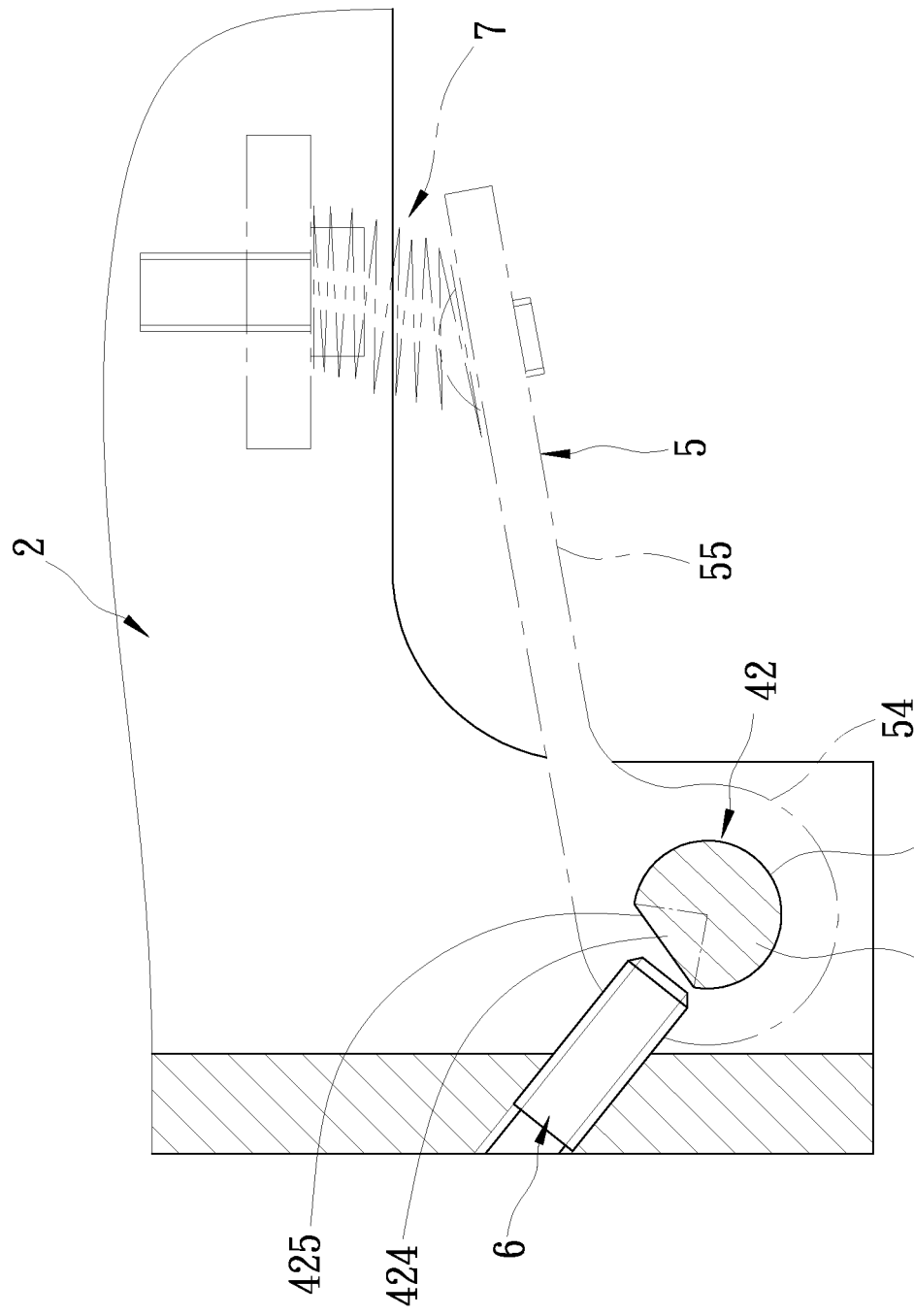
FIG. 6 is similar to FIG. 5, illustrating the first guide rod moved with the associated control set to the unlocking position.

Referring to FIGS. 4, 5 and 6, when the control sets 5 are rotated between the biased, unactuated, locked configuration, and the unlocked configuration, the first guide rods 42 are rotated by the respective control sets 5 between the locking position and the adjustable unlocking position. When in the locking position (see FIG. 5), the handle 55 of each control set 5 positioned adjacent to the associated spring member 7 is biased away from the top of the groove 31 of the associated extension member 3, and the arc shaped surface 422 of the first big radial portion 421 of each first guide rod 42 is biased against and engaged with the associated stop member 6 so that the first guide rod 42 and the associated extension member 3 are immovable relative to the worktable body 2. When the respective handle 55 of each control set 5 is rotated to the adjustable unlocking position (see FIG. 6), the end of each control set 5 adjacent to the associated spring member 7 is lifted to compress the spring member 7 and is held close to the top of the groove 31 of the associated extension member 3, such that the flat plane 425 of the second small radial portion 424 of each first guide rod 42 is disposed adjacent to but not in contact with the associated stop member 6, and the first big radial portion 421 of each first guide rod 42 is moved away from the associated stop member 6 so that the first guide rod 42 and the associated extension member 3 are movable relative to the worktable body 2.

Thus, in order to adjust the position of one extension member 3 during the use of the worktable, a user can grasp the outer side of the extension member 3 with one hand and insert the fingers thereof into the groove 31 of the extension member 3 to operate the handle 55 of the associated control set 5 to rotate the associated first guide rod 42 to the adjustable unlocking position. At this time, the first big radial portion 421 and second small radial portion 424 of the respective first guide rod 42 are not constrained by the associated stop member 6, and therefore the respective first guide rod 42 is movable relative to the worktable body 2. At this time, the user can move the respective extension member 3 in a direction toward or away from the worktable body 2 in order to adjust the width of the worktable 1 in order to accommodate different sized workpieces.

After the respective extension member 3 has been moved to the desired target position, the operator can release their hand from the respective extension member 3 for enabling the associated control set 5 to be returned to the locking configuration by the associated spring member 7, therefore rotating the respective first guide rod 42 back into the locking position. When the locking position is reached, the first big radial portion 421 of the respective first guide rod 42 is retained in position by engagement with the associated stop member 6, and therefore the respective first guide rod 42 is immovable relative to the worktable body 2, so that the respective extension member 3 is locked in position relative to the worktable body 2.

Further, when the respective control set 5 is not operated by the user, the associated spring member 7 imparts an initial pre-pressure to the respective control set 5, holding the associated first guide rod 42 in the locking position and avoiding inadvertent false movement of the respective extension member 3.

Figure 7:
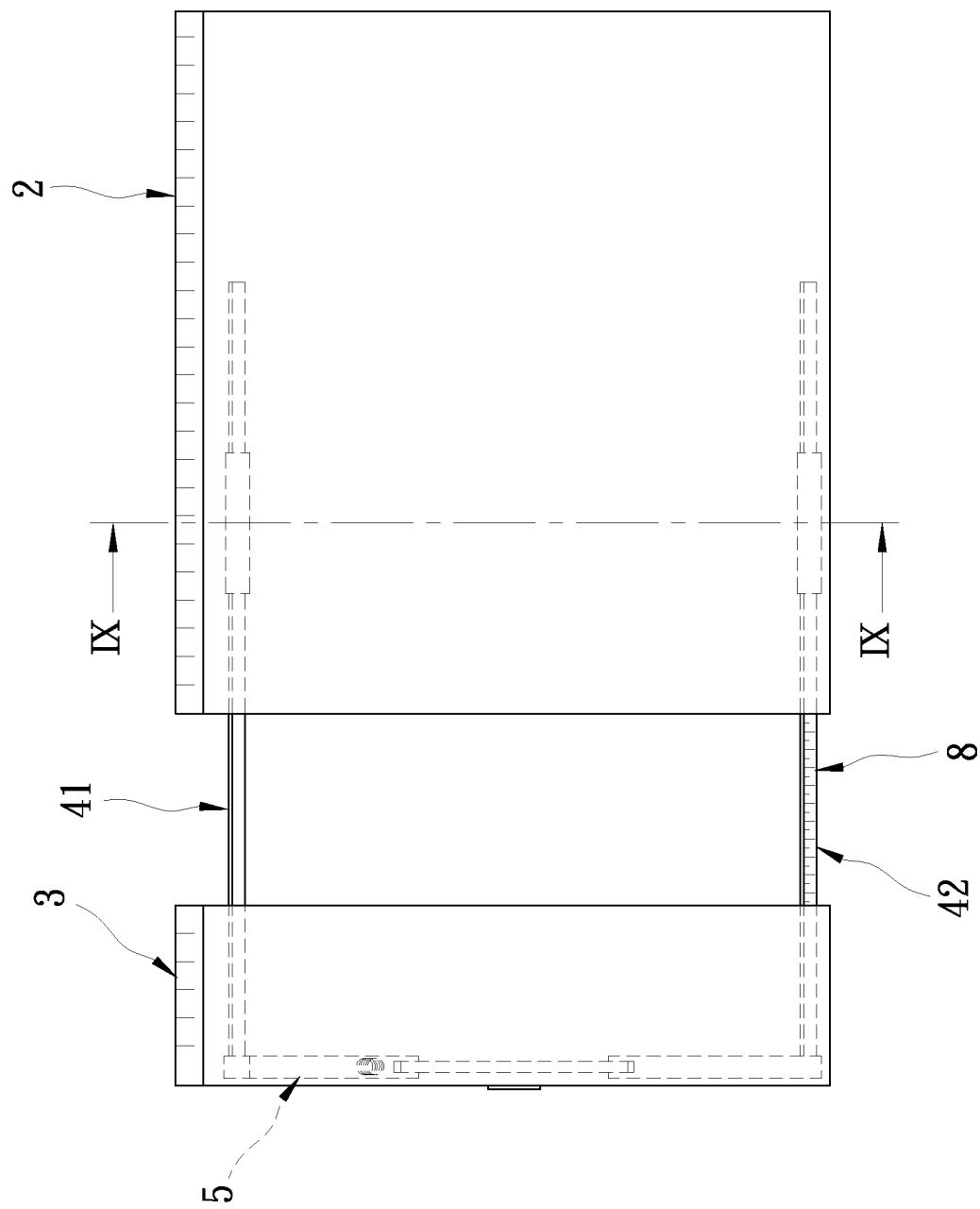
FIG. 7 is a top view of a width adjustable worktable in accordance with a second embodiment of the present disclosure.
Figure 8:
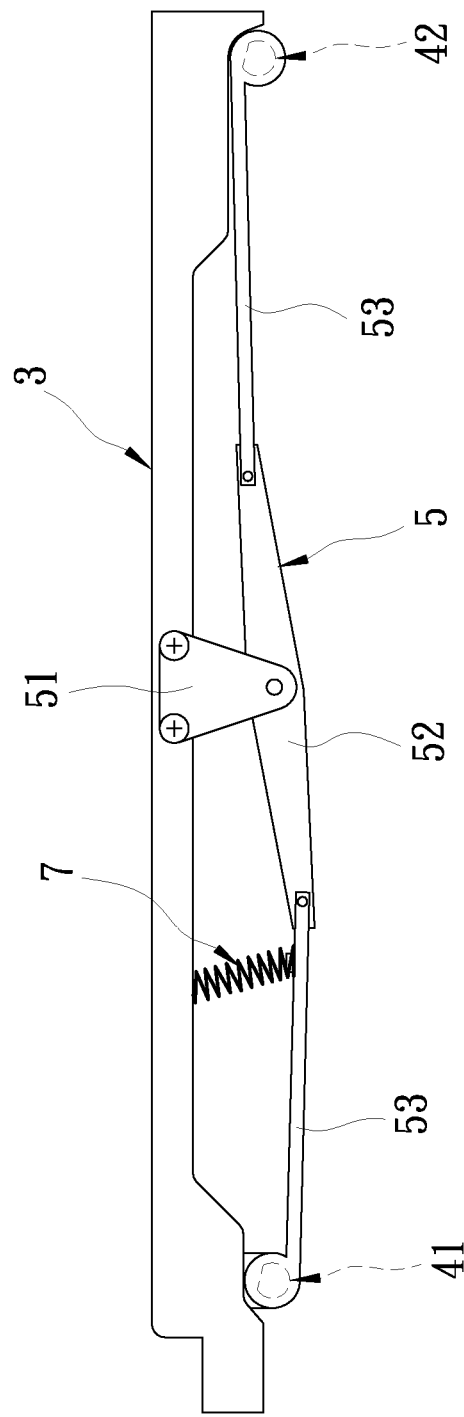
FIG. 8 is a side view of a width adjustable worktable in accordance with the second embodiment of the present disclosure, illustrating a second guide rod and a first guide rod in the locking position.
Figure 9:
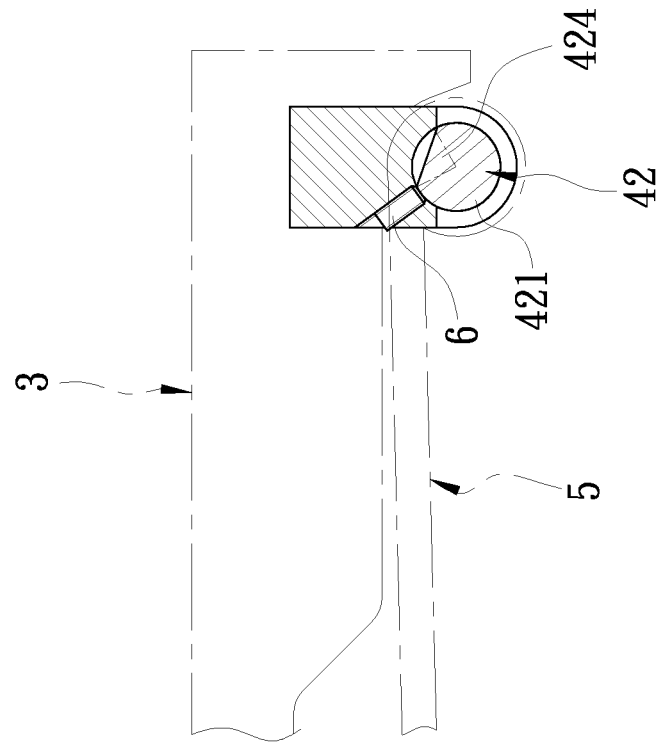
FIG. 9 is a partial sectional view taken along line IX-IX of FIG. 7, illustrating the control set having moved the second guide rod and the first guide rod to the locking position.
Figure 9:
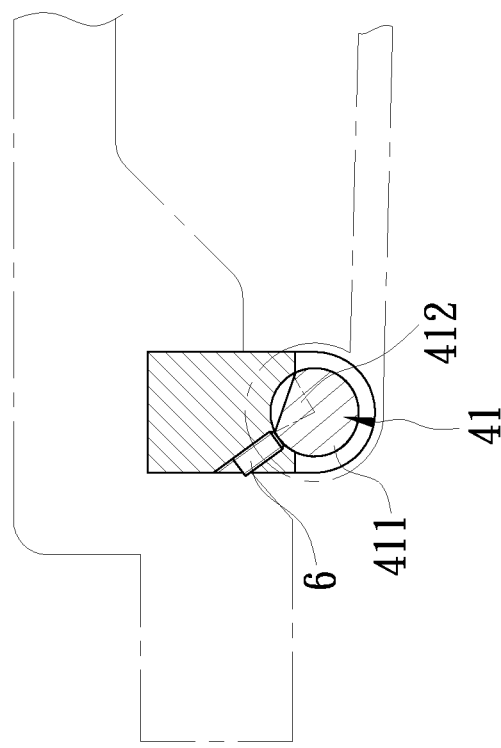

FIGS. 7 through 9 illustrate a width adjustable worktable in accordance with a second embodiment of the present disclosure.

This second embodiment is substantially similar to the aforesaid first embodiment with the exception that this second embodiment includes one extension member 3, one second guide rod 41, one first guide rod 42, one control set 5, one spring member 7, one scale 8, and two stop members 6. The two stop members 6 respectively extend toward the first guide rod 42 and the second guide rod 41.

The control set 5 includes a pivot holder 51 affixed to the extension member 3, a swivel member 52 pivotally coupled to the pivot holder 51, and two links 53 respectively coupled between the first guide rod 42 and second guide rod 41 and the swivel member 52.

The spring member 7 is connected between the extension member 3 and the link 53 that is disposed adjacent to the second guide rod 41.

The second guide rod 41 is rotatable with the control set 5 about its own axis. Similar to the first guide rod 42, the second guide rod 41 includes a first big radial portion 411 and a second small radial portion 412 that are radially abutted against each other in the same manner as discussed above. The links 53 are respectively coupled between the two opposed ends of the swivel member 52 and the first guide rod 42 and second guide rod 41. The first guide rod 42 and the second guide rod 41 are movable by the swivel member 52 and the links 53 between the locking position and the adjustable unlocking position.

Figure 10:
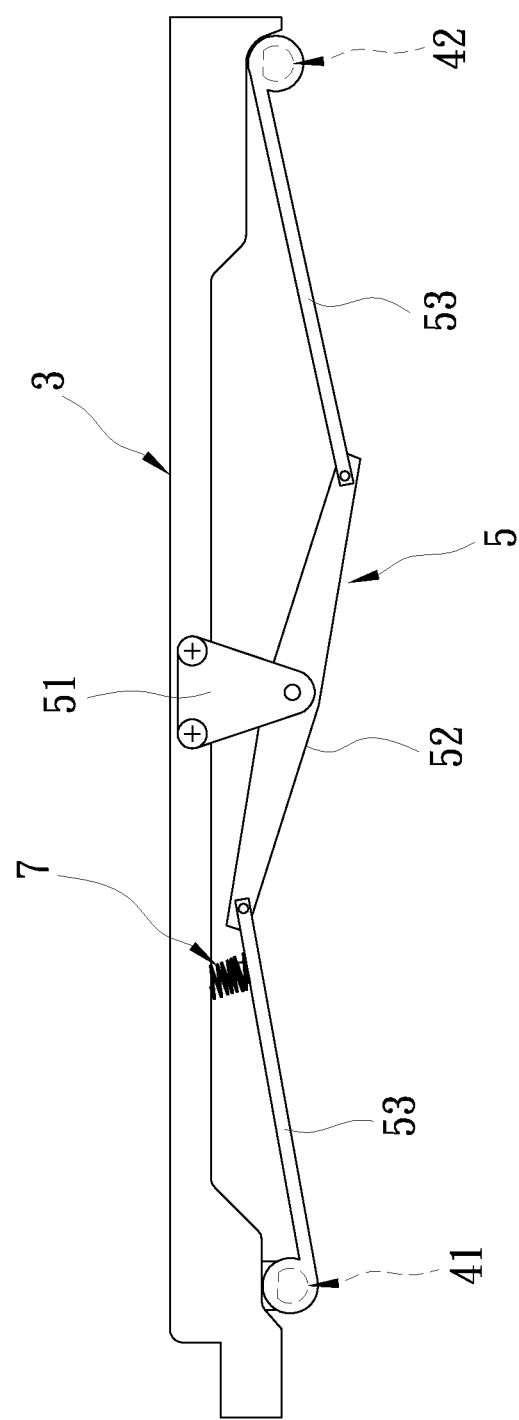
FIG. 10 is similar to FIG. 8, illustrating the second guide rod and the first guide rod in the adjustable unlocking position.
Figure 11:
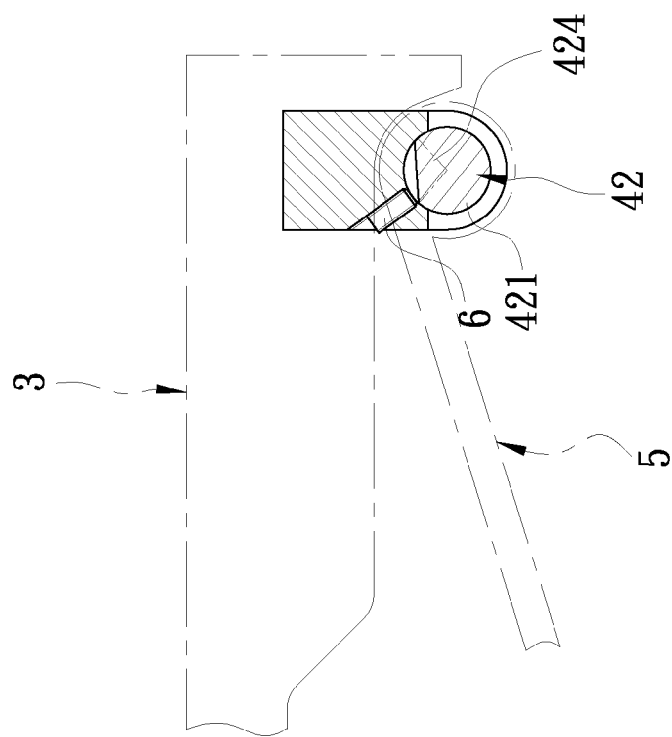
FIG. 11 is similar to FIG. 9, illustrating the control set having moved the second guide rod and the first guide rod to the adjustable unlocking position.
Figure 11:
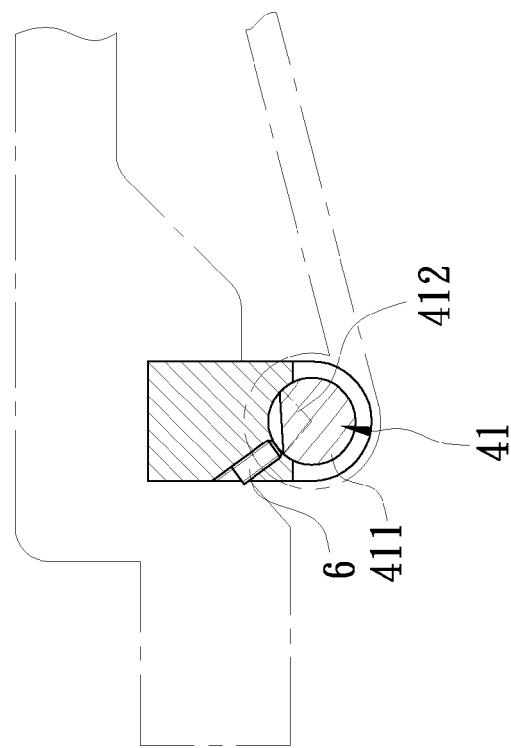

When in the locking position (see FIGS. 8 and 9), the first big radial portions 411;421 are respectively biased against the respective stop members 6; when in the adjustable unlocking position (see FIGS. 10 and 11), the second small radial portions 412;424 are respectively disposed adjacent to but not in contact with the stop members 6.

Thus, this second embodiment achieves the same objects and effects as the aforesaid first embodiment. Further, because the first guide rod 42 and the second guide rod 41 are synchronously adjustable between the locking position and the adjustable unlocking position, the two ends of the extension member 3 are constantly maintained in balance. Therefore, this embodiment is practical for use in a large scale worktable that is highly sensitive to horizontal balance.

Figure 12:
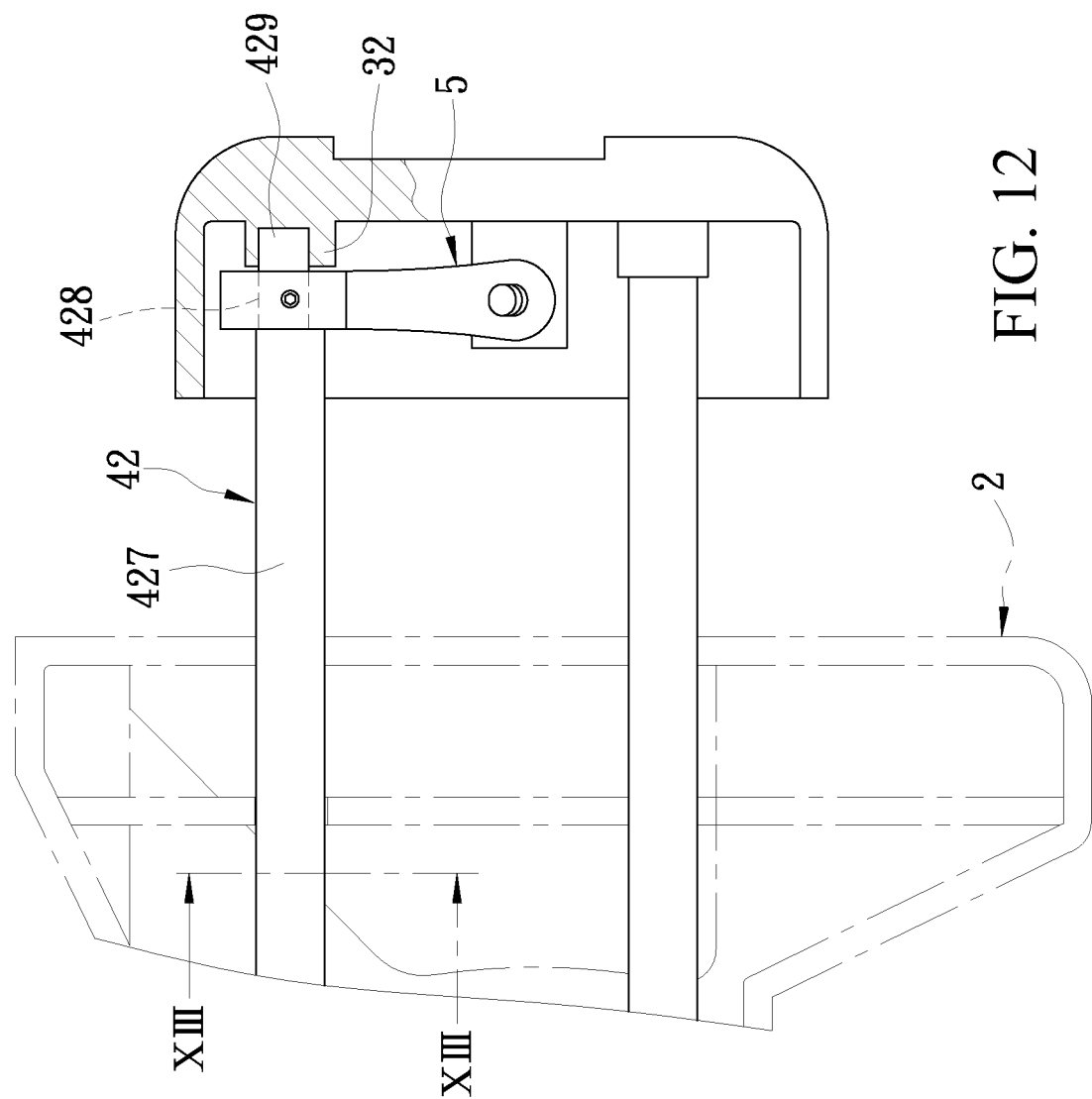
FIG. 12 is a bottom view of a width adjustable worktable in accordance with a third embodiment of the present disclosure.
Figure 13:
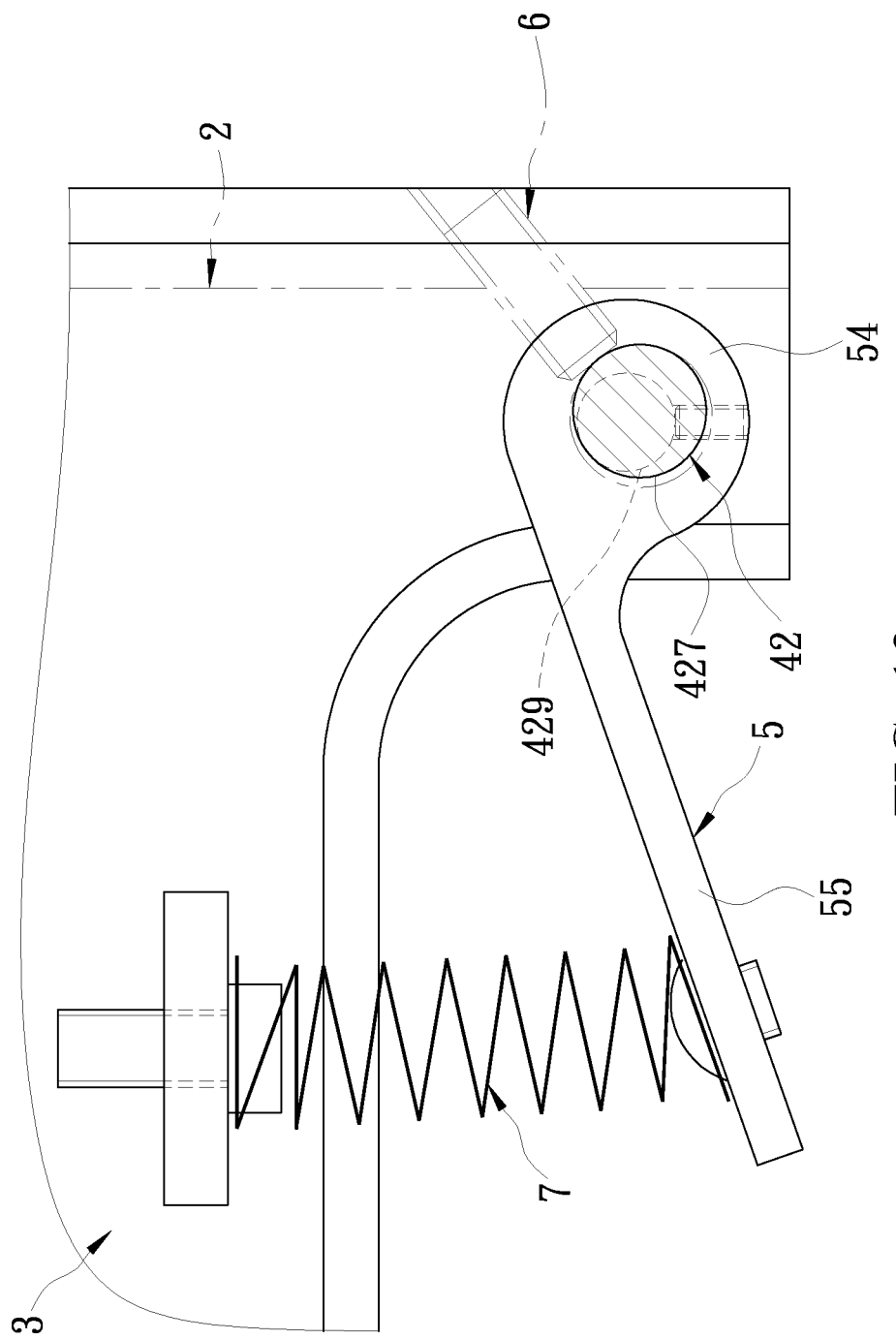
FIG. 13 is a sectional view taken along line XIII-XIII of FIG. 12, illustrating the first guide rod in the locking position.
Figure 14:
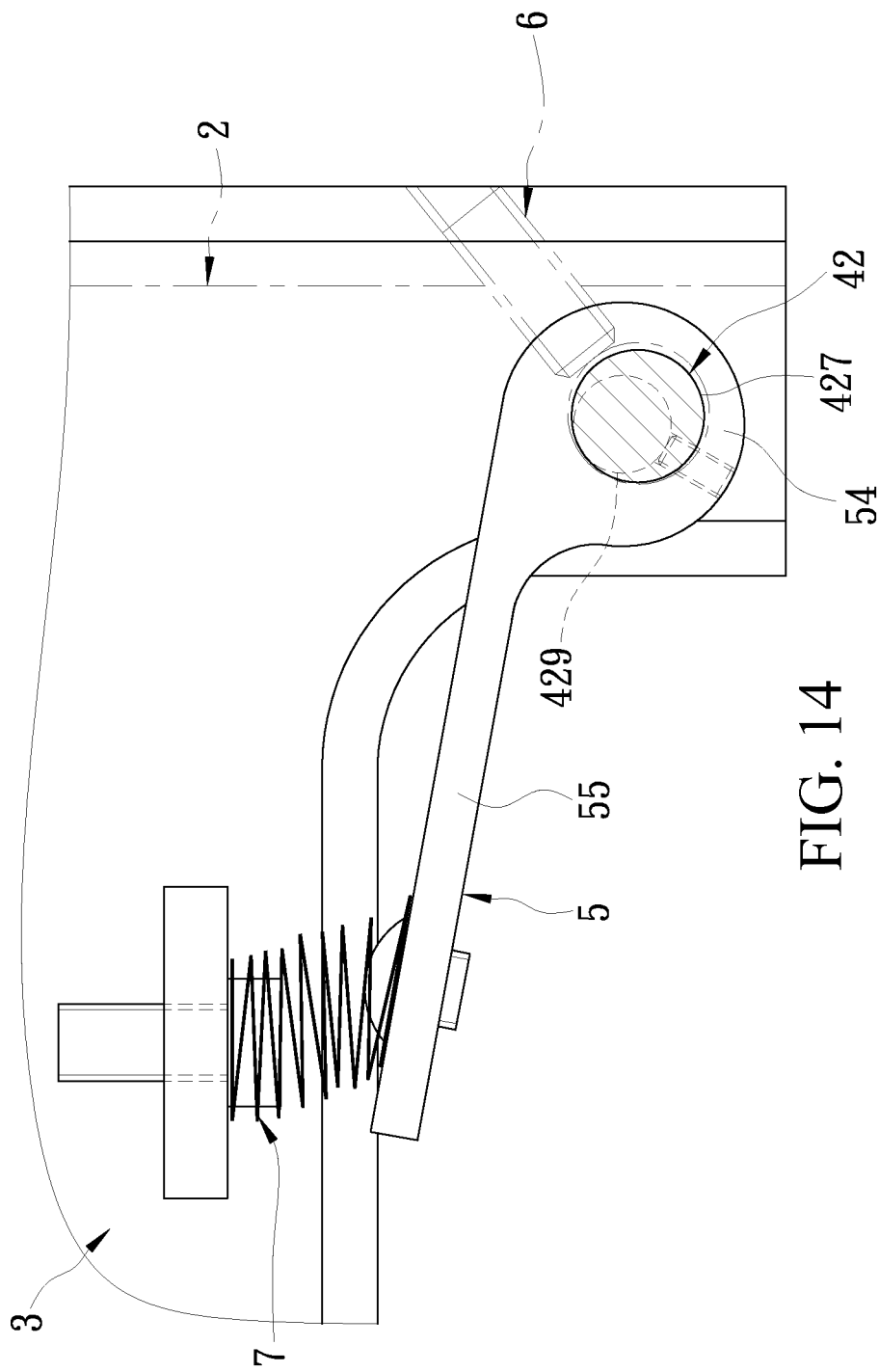
FIG. 14 is similar to FIG. 13, illustrating the first guide rod in the adjustable unlocking position.
Figure 15:
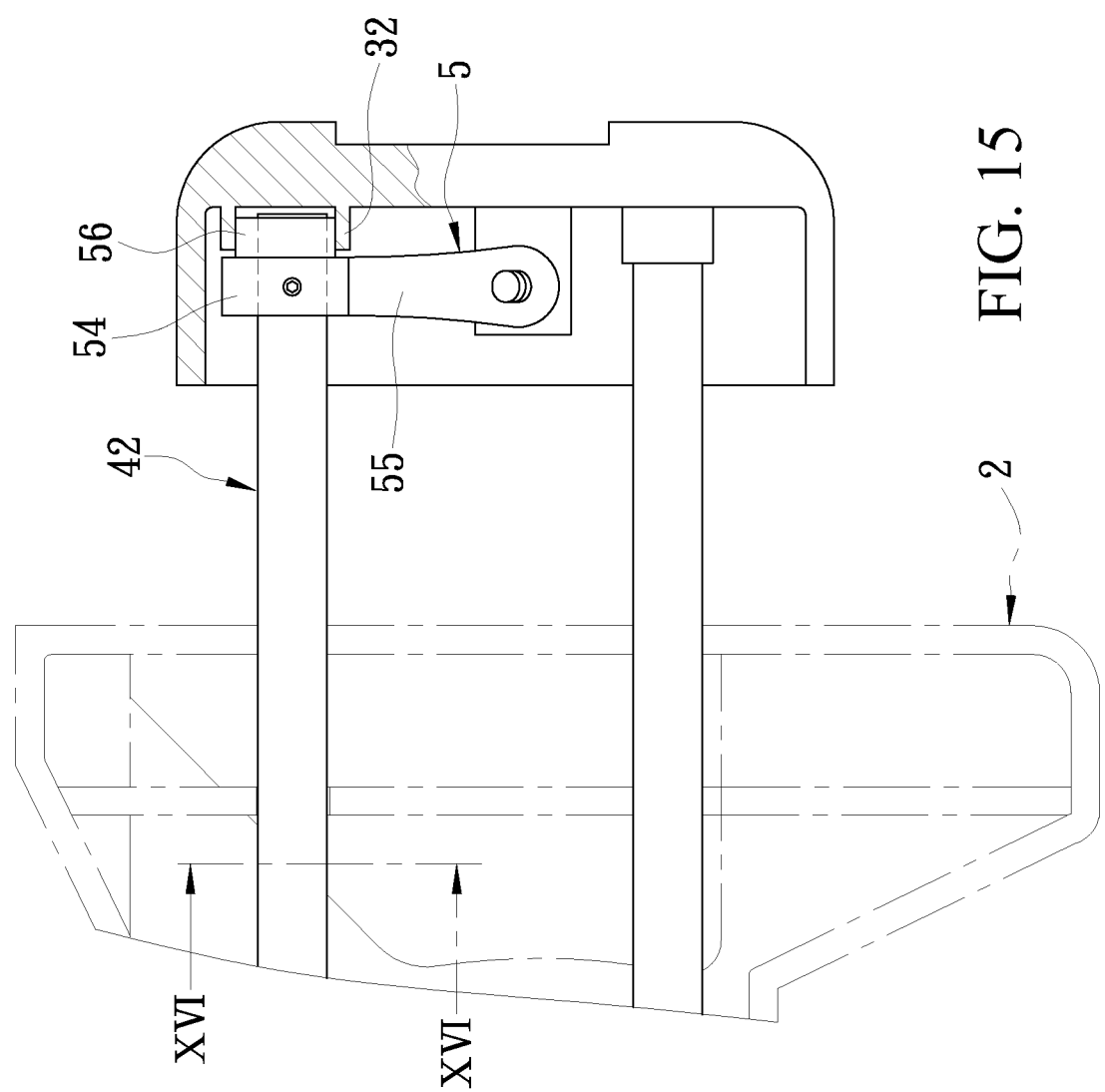
FIG. 15 is a bottom view of a width adjustable worktable in accordance with a fourth embodiment of the present disclosure.

FIGS. 12 through 14 illustrate a width adjustable worktable in accordance with a third embodiment of the present disclosure.

This third embodiment is substantially similar to the aforesaid first embodiment with the exception that this third embodiment includes one extension member 3, one second guide rod 41, one first guide rod 42, one control set 5, one stop member 6, one spring member 7 and one scale 8.

The first guide rod 42 includes a rod body 427, a connection portion 428 located on one end of the rod body 427 and coupled to the axle sleeve 54, and an eccentric portion 429 extending from one side of the connection portion 428 opposite to the rod body 427. According to this embodiment, the connection portion 428 and the eccentric portion 429 are concentric; the outer diameter of the eccentric portion 429 is smaller than the outer diameter rod body 427.

The extension member 3 further includes a collar 32 arranged on the eccentric portion 429 to prohibit rotation of the eccentric portion 429 about its own axis.

The first guide rod 42 is movable by the control set 5 to rotate about the axis of the eccentric portion 429, thereby causing movement of the rod body 427 between a locking position and an adjustable unlocking position.

When in the locking position (see FIG. 13), the rod body 427 is biased against the stop member 6 and thus locked to the worktable body 2, prohibiting movement of the first guide rod 42 relative to the worktable body 2, and therefore the extension member 3 is immovable relative to the worktable body 2. When in the adjustable unlocking position (see FIG. 14), the rod body 427 is moved away from the stop member 6, allowing movement of the first guide rod 42 relative to the worktable body 2, and therefore the extension member 3 is movable relative to the worktable body 2.

Thus, this third embodiment achieves the same objects and effects as the aforesaid first embodiment.

Figure 16:
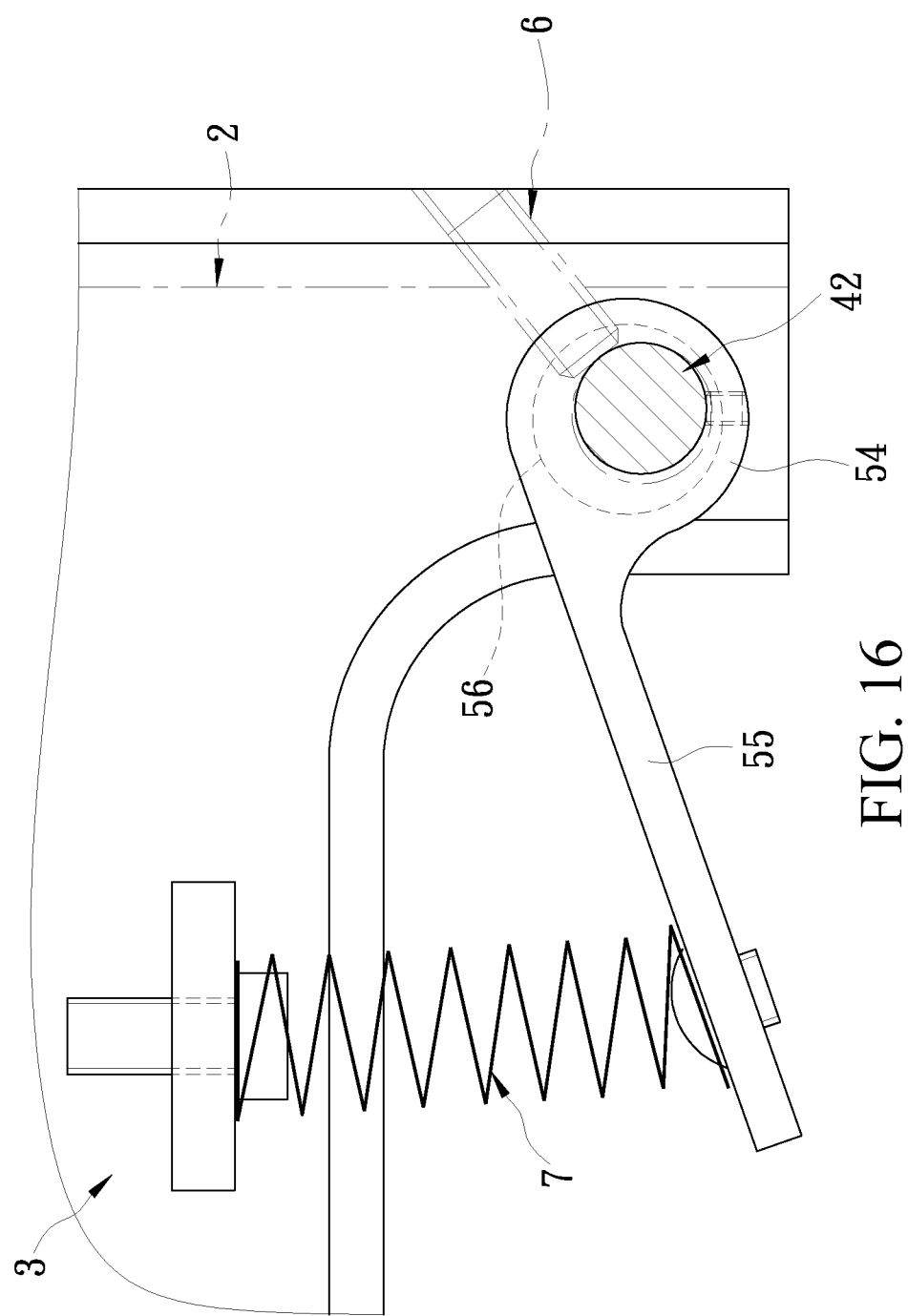
FIG. 16 is a sectional view taken along line XVI-XVI of FIG. 15, illustrating the first guide rod in the locking position.
Figure 17:
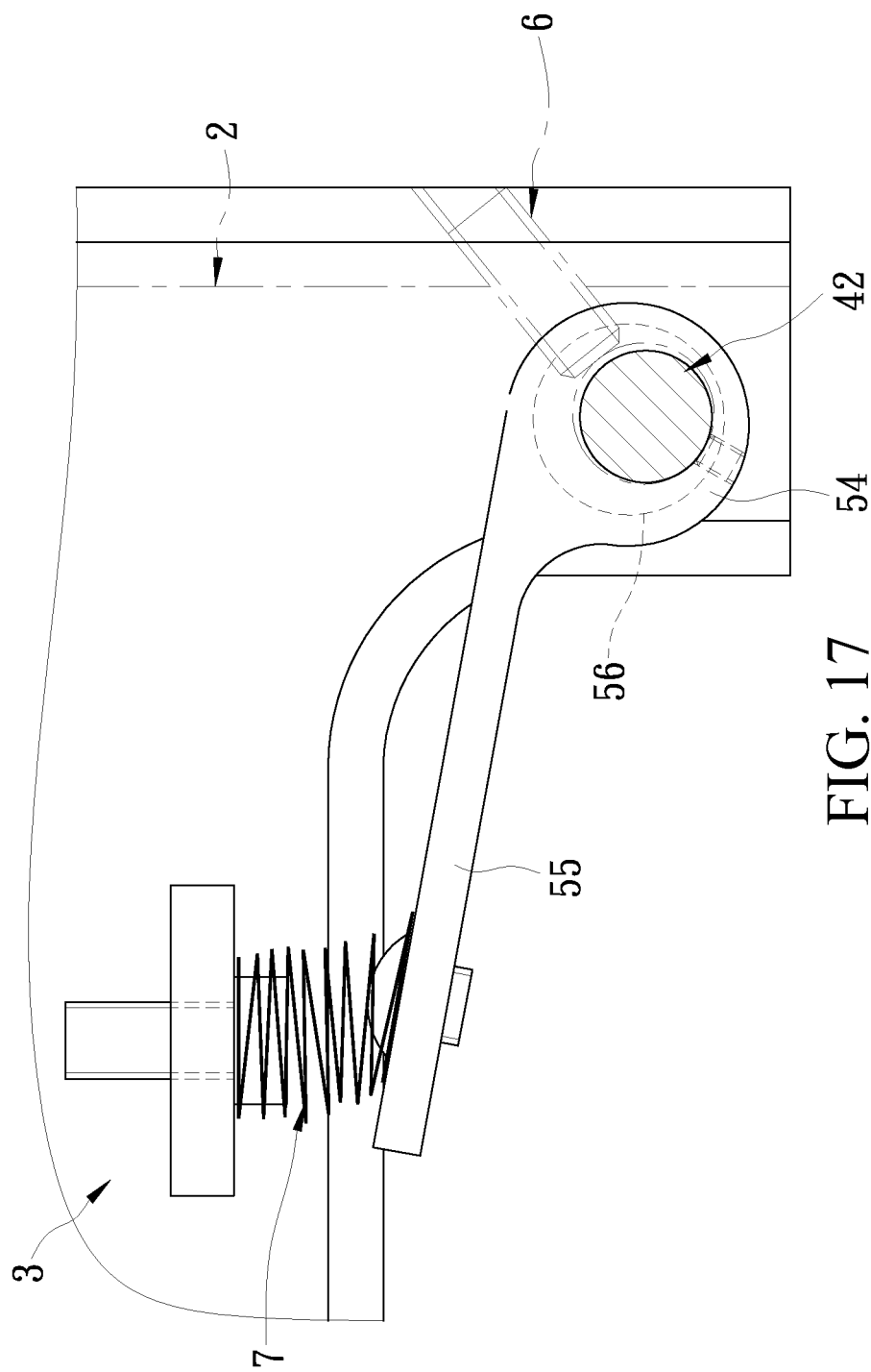
FIG. 17 is similar to FIG. 16, illustrating the first guide rod in the adjustable unlocking position.

FIGS. 16 and 17 illustrate a width adjustable worktable in accordance with a fourth embodiment of the present disclosure.

This fourth embodiment is substantially similar to the aforesaid first embodiment with the exception that this fourth embodiment includes one extension member 3, one second guide rod 41, one first guide rod 42, one control set 5, one stop member 6, one spring member 7 and one scale 8.

The control set 5 further includes a protrusion 56 extending from one side of the axle sleeve 54 opposite to the worktable body 2 in an offset manner relative to the first guide rod 42.

The extension member 3 further includes a collar 32 arranged on the protrusion 56 to prohibit rotation of the protrusion 56 about its own axis.

The first guide rod 42 is rotatable by the handle 55 of the control set 5 to rotate protrusion 56 about its own axis in the collar 32, thereby causing movement of the first guide rod 42 between a locking position and an adjustable unlocking position.

When in the locking position (see FIG. 16), the first guide rod 42 is engaged with the stop member 6, prohibiting movement of the extension member 3 relative to the worktable body 2. When in the adjustable unlocking position (see FIG. 17), the first guide rod 42 is moved away from the stop member 6, allowing movement of the extension member 3 relative to the worktable body 2.

Thus, this fourth embodiment achieves the same objects and effects as the aforesaid first embodiment.

In the aforesaid first, third or fourth embodiment, one extension member 3 is matched with one first guide rod 42 and one second guide rod 41. However, in an alternative, one extension member 3 can be matched with one first guide rod 42 to achieve the same effects, thus simplifying the component structure.

Figure 1:
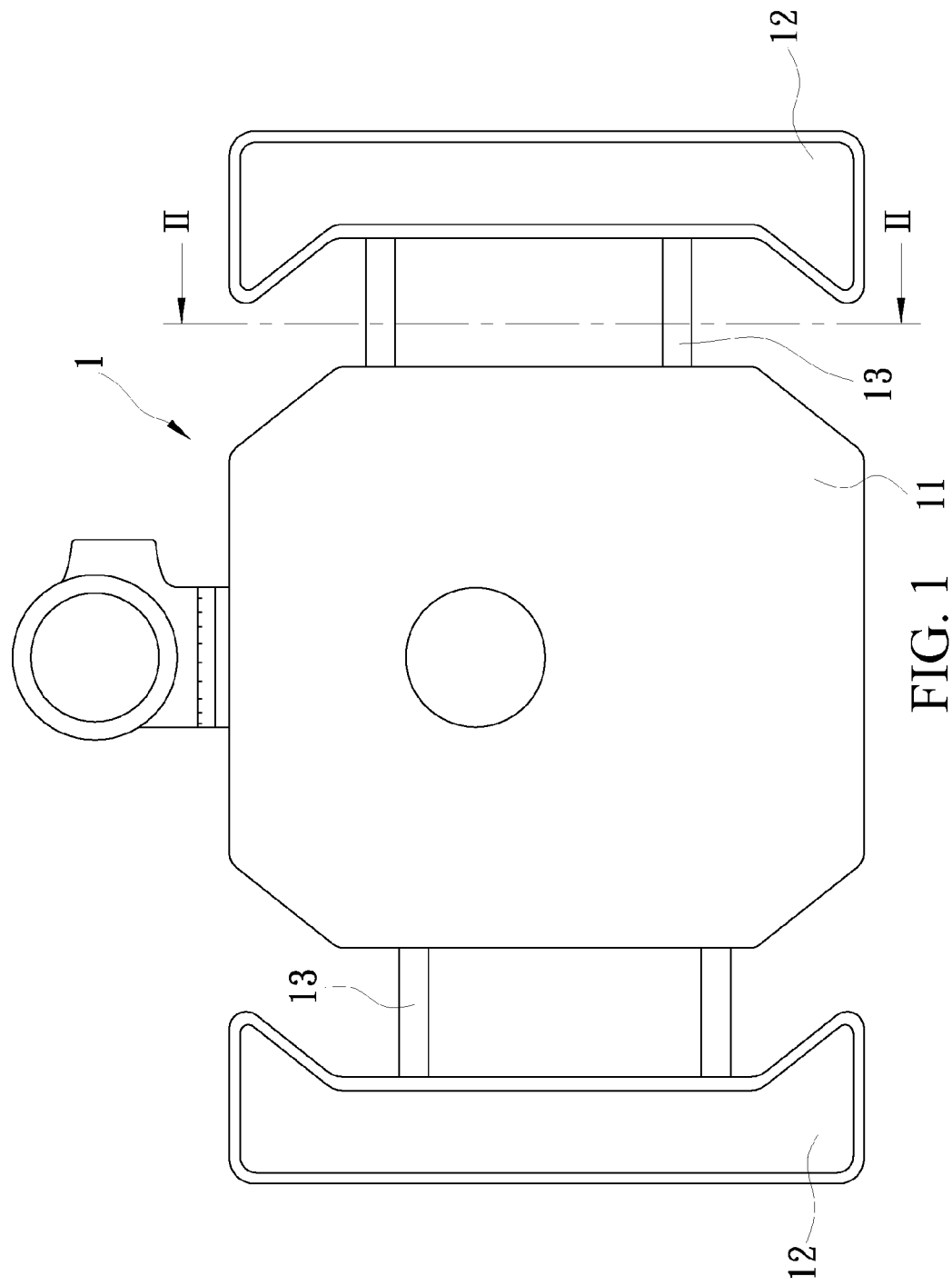
FIG. 1 is a top view of an extendable worktable for a machine tool according to the prior art.
Figure 2:
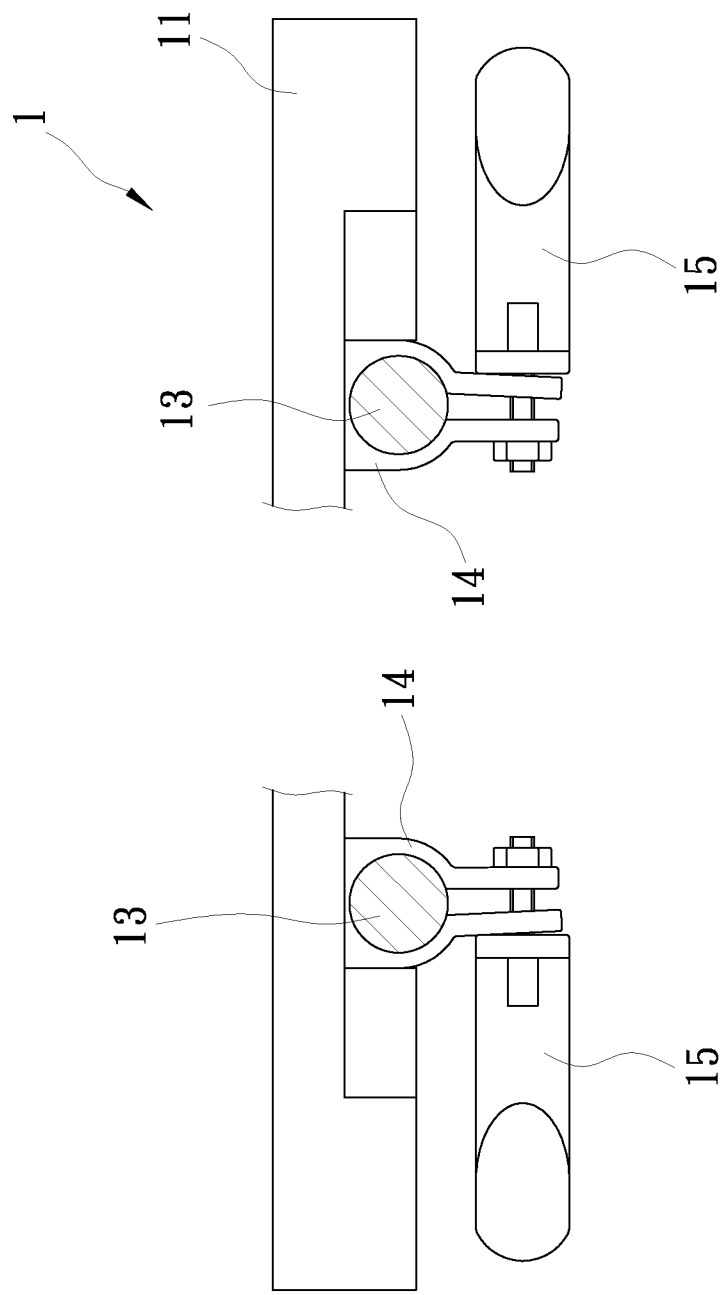
FIG. 2 is a sectional view taken along line II-II of FIG. 1.

During the operation of a small scale worktable configured subject to the first, third or fourth embodiment of the present disclosure, a user can operate the control set 5 with one hand in order to change the positioning status of the first guide rod 42, and then directly move the extension member 3 with the same hand to rapidly adjust the width of the worktable. When compared to the prior art design in FIGS. 1 and 2, adjustment of the width of the worktable in accordance with the present disclosure is quite simple. During the operation of the large scale worktable configured subject to the second embodiment of the present disclosure, the user can directly operate the control set 5 with one hand to simultaneously change the positioning status of the first guide rod 42 and the second guide rod 41, and then move the extension member 3 with the same hand to rapidly adjust the width of the worktable. Thus, the disclosure achieves the objects and effects as stated above.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A width adjustable worktable, comprising:
   a worktable body;
   an extension member coupled to a side of the worktable body and selectively movable relative to said worktable body in a direction toward or away from the worktable body to adjust the width of the worktable for accommodating different sized workpieces and providing auxiliary support for the workpieces;
   at least one first guide rod connected to said extension member and movably mounted with said worktable body; and
   a control set mounted at said extension member and movable relative to said extension member to move said at least one first guide rod between a locking position, where said at least one first guide rod is prohibited from movement relative to said worktable body and an unlocking position, where said at least one first guide rod is movable relative to said worktable body.

2. The width adjustable worktable according to claim 1, wherein said control set comprises an axle sleeve connected to said extension member, a handle extending from said axle sleeve; said at least one first guide rod movable by said control set to rotate about an axis of said at least one first guide rod and having a first radial portion and a second smaller radial portion radially abutted against each other, said first radial portion engaged with said worktable body when in said locking position, said first radial portion and said second smaller radial portion spaced from said worktable body for allowing movement of said at least one first guide rod relative to said worktable body when in said unlocking position.

3. The width adjustable worktable according to claim 2, further comprising at least one stop member located on said worktable body and extending toward said at least one first guide rod, wherein said first radial portion engages said at least one stop member and thus prohibits movement relative to said worktable body when in said locking position; said second smaller radial portion is disposed adjacent to and spaced from said at least one stop member and movable relative to said worktable body when in said unlocking position.

4. The width adjustable worktable according to claim 3, further comprising a spring member positioned between said extension member and said control set.

5. The width adjustable worktable according to claim 3, further comprising at least one second guide rod connected to said extension member in a parallel manner to the at least one first guide rod and movably mounted with said worktable body.

6. The width adjustable worktable according to claim 5, wherein said extension member comprises a groove located on a bottom side thereof adapted for accommodating said control set.

7. The width adjustable worktable according to claim 5, further comprising a scale arranged on one of said at least one first guide rod and said at least one second guide rod.

8. The width adjustable worktable according to claim 5, wherein said first radial portion comprises an arc shaped surface disposed at an outer side thereof; said second smaller radial portion comprises a flat plane disposed at an outer side thereof opposite to said arc shaped surface; said arc shaped surface is engaged with said at least one stop member when in said locking position; said arc shaped surface is disposed adjacent and spaced from said at least one stop member when in said unlocking position.

9. The width adjustable worktable according to claim 5, wherein said control set comprises a pivot holder located on said extension member, a swivel member pivotally mounted to said pivot holder, and two links respectively coupled between said swivel member and said at least one first guide rod and said at least one second guide rod.

10. The width adjustable worktable according to claim 9, wherein each said at least one second guide rod is movable by said control set to rotate about an axis of each respective at least one second guide rod, and comprises a first radial portion and a second smaller radial portion abutted against each other; said links are respectively coupled between two opposed ends of said swivel member and said at least one first guide rod and said at least one second guide rod for enabling said at least one first guide rod and said at least one second guide rod to be moved by said swivel member between said locking position and said unlocking position.

11. The width adjustable worktable according to claim 10, having first and second stop members, and the first and second stop members are arranged to extend toward said at least one first guide rod and said at least one second guide rod, respectively; the first radial portion of said at least one first guide rod and the first radial portion of each said at least one second guide rod are respectively engaged with said first and second stop members when in said locking position; the second smaller radial portion of said at least one first guide rod and the second smaller radial portion of each said at least one second guide rod are respectively disposed adjacent to and spaced from said first and second stop members when in said unlocking position.

12. The width adjustable worktable according to claim 1, wherein said first at least one guide rod comprises a rod body, a connection portion located on one end of said rod body and coupled to said control set, and an eccentric portion extending from one side of said connection portion opposed to said rod body; said control set comprises an axle sleeve connected to said connection portion and a handle extending from said axle sleeve.

13. The width adjustable worktable according to claim 12, further comprising a stop member located on said worktable body and extending toward said at least one first guide rod, wherein said rod body is engaged with said stop member and prohibiting movement relative to said worktable body when in said locking position; said rod body is spaced from said stop member when in said unlocking position.

14. The width adjustable worktable according to claim 13, wherein said extension member comprises a collar arranged on said eccentric portion to limit rotation of said eccentric portion about the axis thereof.

15. The width adjustable worktable according to claim 14, further comprising a spring member positioned between said extension member and said control set.

16. The width adjustable worktable according to claim 15, wherein said connection portion and said eccentric portion are concentric and said eccentric portion has an outer diameter smaller than an outer diameter of said rod body.

17. The width adjustable worktable according to claim 16, further comprising at least one second rod member connected to said extension member in a parallel manner relative to said at least one first guide rod and movably mounted with said worktable body.

18. The width adjustable worktable according to claim 1, wherein said control set comprises an axle sleeve connected to said at least one first guide rod, a handle extending from said axle sleeve and a protrusion extending from one side of said axle sleeve opposite to said worktable body in an offset manner relative to said at least one first guide rod; said at least one first guide rod is locked to said worktable body when driven by said control set to rotate about an axis of said protrusion to said locking position; said at least one first guide rod is unlocked from said worktable body and movable relative to said worktable body when in said unlocking position.

19. The width adjustable worktable according to claim 18, further comprising a stop member located on said worktable body and extending toward said at least one first guide rod.

20. The width adjustable worktable according to claim 19, wherein said extension member comprises a collar arranged on said protrusion to limit rotation of said protrusion about an axis thereof.

21. The width adjustable worktable according to claim 20, further comprising a spring member positioned between said extension member and said control set.

22. The width adjustable worktable according to claim 21, further comprising at least one second guide rod connected to said extension member in a parallel manner relative to said at least one first guide rod and movably mounted with said worktable body.

* * * * *